(12) United States Patent
Koga et al.

(10) Patent No.: US 8,223,804 B2
(45) Date of Patent: Jul. 17, 2012

(54) SYNCHRONIZED COMMUNICATION SYSTEM

(75) Inventors: Hidetsugu Koga, Kitakyushu (JP); Mamoru Fukuda, Kitakyushu (JP); Tatsuhiko Satou, Kitakyushu (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 221 days.

(21) Appl. No.: 12/559,501

(22) Filed: Sep. 15, 2009

(65) Prior Publication Data

US 2010/0008383 A1    Jan. 14, 2010

Related U.S. Application Data

(63) Continuation of application No. PCT/JP2008/055636, filed on Mar. 26, 2008.

(30) Foreign Application Priority Data

Mar. 28, 2007    (JP) ................................. 2007-085682

(51) Int. Cl.
*H04J 3/06* (2006.01)
*H04L 12/28* (2006.01)

(52) U.S. Cl. ........................................ 370/503; 370/414
(58) Field of Classification Search .................. 370/503, 370/414
See application file for complete search history.

(56) References Cited

U.S. PATENT DOCUMENTS

| | | | |
|---|---|---|---|
| 5,177,739 A | | 1/1993 | Basnuevo et al. |
| 5,619,498 A | * | 4/1997 | Sharpe ........................... 370/396 |
| 5,913,053 A | * | 6/1999 | Nonogaki et al. ............. 713/400 |
| 6,108,713 A | * | 8/2000 | Sambamurthy et al. ...... 709/250 |
| 6,389,547 B1 | * | 5/2002 | James et al. ................... 713/400 |
| 7,649,912 B2 | * | 1/2010 | Balasubramanian et al. 370/509 |
| 2003/0235216 A1 | * | 12/2003 | Gustin .......................... 370/509 |
| 2004/0258097 A1 | | 12/2004 | Arnold et al. |
| 2006/0271805 A1 | | 11/2006 | Pearce et al. |

FOREIGN PATENT DOCUMENTS

| | | |
|---|---|---|
| EP | 0260696 | 3/1988 |
| EP | 0515029 | 11/1992 |

(Continued)

OTHER PUBLICATIONS

Supplementary European Search Report for corresponding EP Application No. 08738862.5-2415, Jul. 4, 2011.

*Primary Examiner* — Huy D Vu
*Assistant Examiner* — Angel Brockman
(74) *Attorney, Agent, or Firm* — Ditthavong Mori & Steiner, P.C.

(57) ABSTRACT

A synchronized communication system is provided in which even when communication devices are connected in series to a transmission path, devices connected to the communication devices are synchronized so that a communication cycle can be reduced. A second communication device includes a relay path and a return path which do not pass through a storage device, and a path selection switch therefor. A first communication device instructs switching of the return path from the transmission path, measures a transmission path delay time, notifies the second communication device of it, and sends a reference time of the first communication device for each communication cycle. The second communication device corrects its reference time using the transmission path delay time and the reference time. When a new second communication device is found during synchronized communication, the first communication device also performs transmission path delay measurement using the remaining time in the communication cycle.

11 Claims, 8 Drawing Sheets

FOREIGN PATENT DOCUMENTS

| | | |
|---|---|---|
| JP | 10-091222 | 4/1998 |
| JP | 10-142361 | 5/1998 |
| JP | 11-305812 | 11/1999 |
| JP | 2000-503828 | 3/2000 |
| JP | 2007-189457 | 7/2007 |
| WO | WO 97/31455 | 8/1997 |
| WO | 03/028258 | 4/2003 |

\* cited by examiner

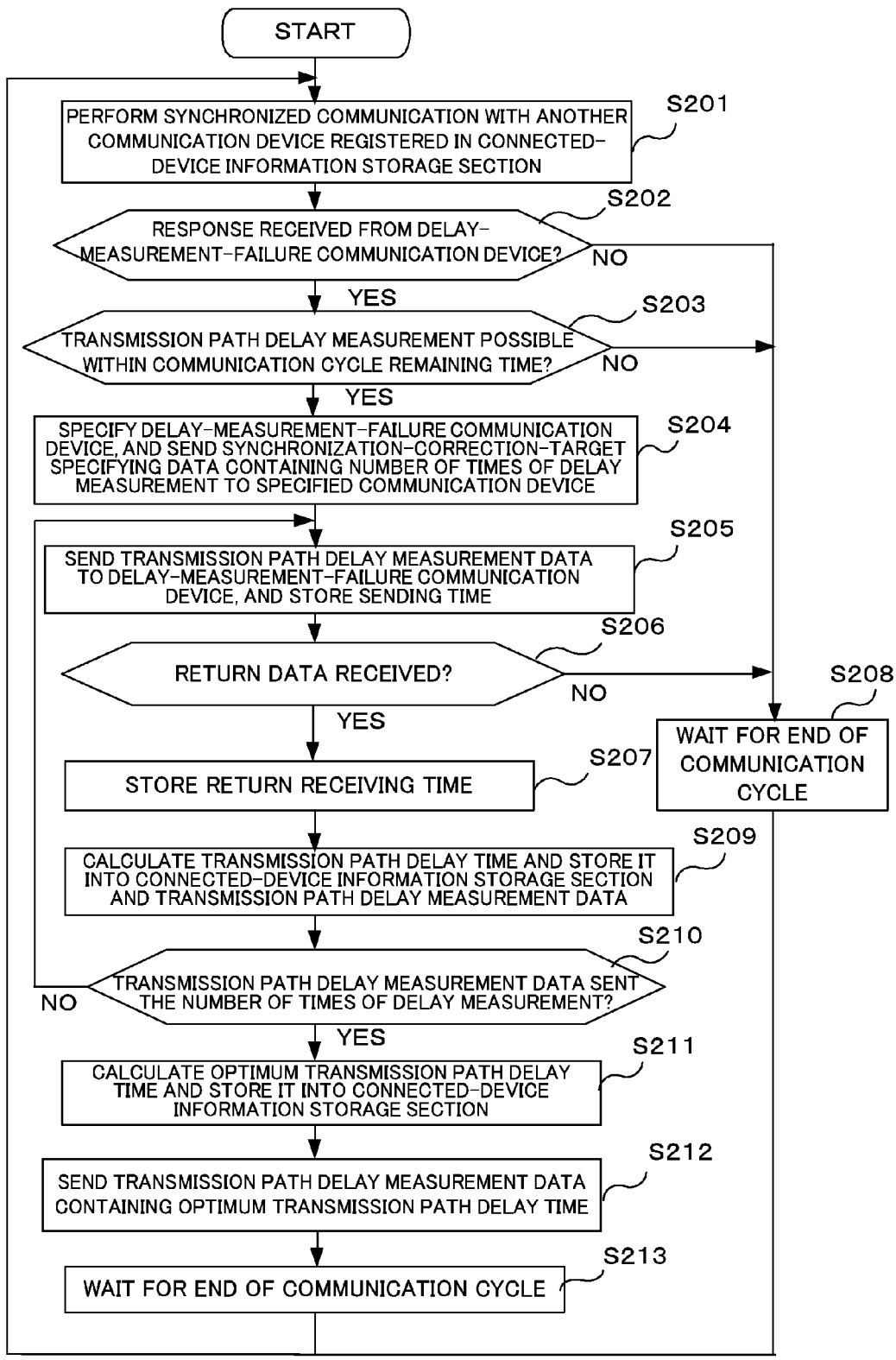

TRANSFER START POSITION IN SYSTEM OF PRESENT INVENTION

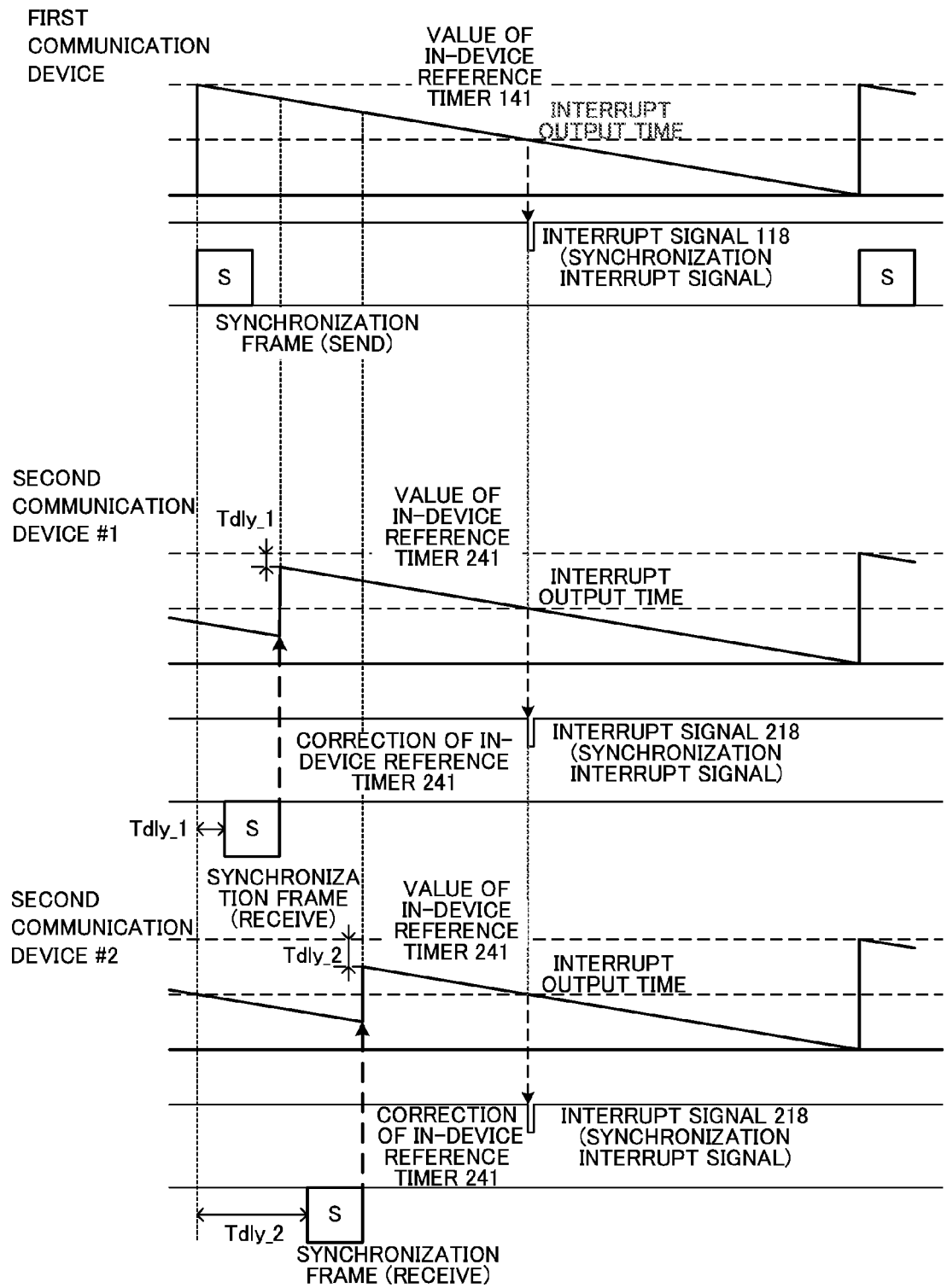

SYNCHRONIZED COMMUNICATION SYSTEM

CROSS-REFERENCE TO RELATED APPLICATION

The present application is related to PCT patent application Ser. No. PCT/JP2008/055636 titled "Communication Device, Synchronized Communication System, and Synchronized Communication Method", and to Japanese Patent application no. 2007-085682 filed at Japan Patent Office titled "Communication Device, Synchronized Communication System, and Synchronized Communication Method", all of which are incorporated herein by reference.

BACKGROUND OF THE INVENTION

1. Field of the Invention

The present invention relates to a synchronized communication system in which all communication devices connected to a transmission path are synchronized with a reference time in the communication system.

2. Description of Related Art

In manufacturing systems, generally, a single control device such as a programmable controller or a personal computer periodically exchanges command data and response data with a plurality of devices such as sensors, relays, and servo drives to perform control. Each device is connected to a transmission path, and the exchange of command data and response data is performed in constant communication cycles through communication. In particular, in motion control systems for machine tools, chip mounters, and the like, a motion controller forms a control loop together with servo drives through a transmission path.

Therefore, a synchronized communication system in which the exchange of command data and response data can be realized in steady communication cycles is demanded to allow these devices to operate in synchronization with the communication cycles. In order to achieve such enhancement in performance of motion control, it is necessary to synchronize the timings of starting the processing of command data received by the servo drives and the like from the motion controller so that the amount of synchronization deviation thereof can be minimized and it is also necessary to shorten as much as possible the communication cycle in which the motion controller and the servo drives exchange command data and response data.

In the related art, in order to synchronize all communication devices connected to a transmission path with a reference time in a communication system, a method has been adopted in which a communication device that manages the reference time informs one or more other communication devices of the reference time.

In industrial fields such as on a production line, devices are often connected in series to a transmission path in order to save wiring. In a case where communication devices are connected in series to a transmission path, the transfer delay time of a relay communication device affects performance.

For example, it is assumed that a first communication device manages a reference time and a plurality of second communication devices operate in synchronization with the first communication device. In a manufacturing system, the first communication device corresponds to, for example, a programmable controller or a personal computer, and the second communication devices correspond to, for example, servo drives, sensors, relays, or the like.

In order to allow a plurality of second communication devices or devices connected to the second communication devices to operate synchronously, a reference time held by each second communication device must have been obtained by correcting the reference time held by the first communication device using the transmission path delay time.

For example, Japanese Unexamined Patent Application Publication No. 10-142361 discloses an example in which a communication device that manages a reference time determines a return delay time (the time required for data to reciprocate) with each communication device connected thereto, measures a delay time to each communication device on the assumption that the time required for outgoing communication and the time required for incoming communication are equal, and corrects the clock time of each communication device so that the clock time can be synchronized with the reference time.

SUMMARY OF THE INVENTION

According to one aspect of the present invention, a synchronized communication system includes a first communication device, and one or more second communication devices each configured to communicate with the first communication device in a predetermined communication cycle. The first communication device includes two first PHY sections each configured to convert a logic signal into an electrical signal. The second communication device includes two second PHY sections each configured to convert a logic signal into an electrical signal. One of two PHY sections in each communication device is connected to a PHY section of another communication device, and the other PHY section is connected to a PHY section of another communication device. The first communication device separately measures transmission path delay times to the second communication devices, separately notifies the second communication devices of the transmission path delay times, and sends a current reference time value in the communication system for each communication cycle. Each of the second communication devices corrects the received current reference time value using the notified transmission path delay time, and sets the corrected value in an in-device reference timer incorporated in the second communication device.

According to another aspect of the present invention, a communication device includes a communication control section that is connected to a transmission path and that controls data to be sent and received, and a host CPU that is connected to the communication control section and that executes a calculation process based on data received by the communication control section and data in a built-in local information storage section to create transmission data and sends the transmission data to the communication control section. The communication control section includes two PHY sections each configured to convert a logic signal into an electrical signal, two Rx FIFO sections (reception first-in first-out sections) that are connected to the PHY sections and that receive data received by the PHY sections, two Tx FIFO sections (transmission first-in first-out sections) that are connected to the PHY sections and that output the received data to the PHY sections, and a LINK section having a built-in in-device reference timer that generates an interrupt signal at a preset timing. Each of the two Rx FIFO sections and each of the two Tx FIFO sections are connected via a relay path, and the two relay paths and the LINK section are connected to each other. A path selection switch is inserted into each of the two relay paths, and one end of a return path is connected to each of the two relay paths. The path selection switch is connected to the other end of the return path when the path selection switch disconnects the corresponding one of the relay paths, operations of the two path selection switches being performed at the same time. In a normal state, the LINK section forms a relay path over which the path selection switches are not caused to perform a switching operation and over which data received by one of the PHY sections is transferred to the other PHY section. But upon receipt of a synchronization-correction-target specifying frame, the LINK section forms a return path over which the path selection switches are caused to perform a switching operation to return data received by the PHY sections. Upon receipt of a transmission path delay measurement frame a predetermined number of times after receiving the synchronization-correction-target specifying frame, the LINK section forms the relay path again using the path selection switches. Upon receipt of the synchronization frame sent from another communication device, the in-device reference timer is corrected so as to be synchronized with a reference time in a communication system.

According to further aspect of the present invention, a synchronized communication method in which in a communication system in which one first communication device and one or more second communication devices are connected to a transmission path, each communication device including a communication control section that controls transmission/reception data and a host CPU section that executes a calculation process based on data received by the communication control section to create transmission data, the communication devices perform synchronized communication, includes the steps of specifying a synchronization-correction-target communication device in accordance with information about the second communication devices that is stored in advance in a connected-device information storage section; sending a transmission path delay measurement frame to the synchronization-correction-target communication device and at the same time storing a sending time; in a case of receiving return data from the synchronization-correction-target communication device, storing a receiving time, and in a case of receiving no return data, additionally writing delay measurement failure into the connected-device information storage section; calculating a transmission path delay time from the sending time and the receiving time and additionally writing the transmission path delay time into the connected-device information storage section; and notifying the synchronization-correction-target communication device of the calculated transmission path delay time, wherein the first communication device repeats the steps on all the second communication devices about which information is stored in the connected-device information storage section and then starts synchronized communication.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 7 is a flowchart showing a delay measurement procedure during synchronized communication by the first communication device in the synchronized communication system according to the present invention;

FIGS. 8A to 8E are diagrams of examples of data formats for communication of the present invention, in which FIG. 8A is a diagram showing a synchronization-correction-target specifying frame, FIG. 8B is a diagram showing a transmission path delay measurement frame, FIG. 8C is a diagram showing a synchronization frame, FIG. 8D is a diagram showing a command frame, and FIG. 8E is a diagram showing a response frame; and FIG. 9 is a timing chart of communication synchronization according to the present invention.

DETAILED DESCRIPTION OF THE EMBODIMENTS

Figure 1:
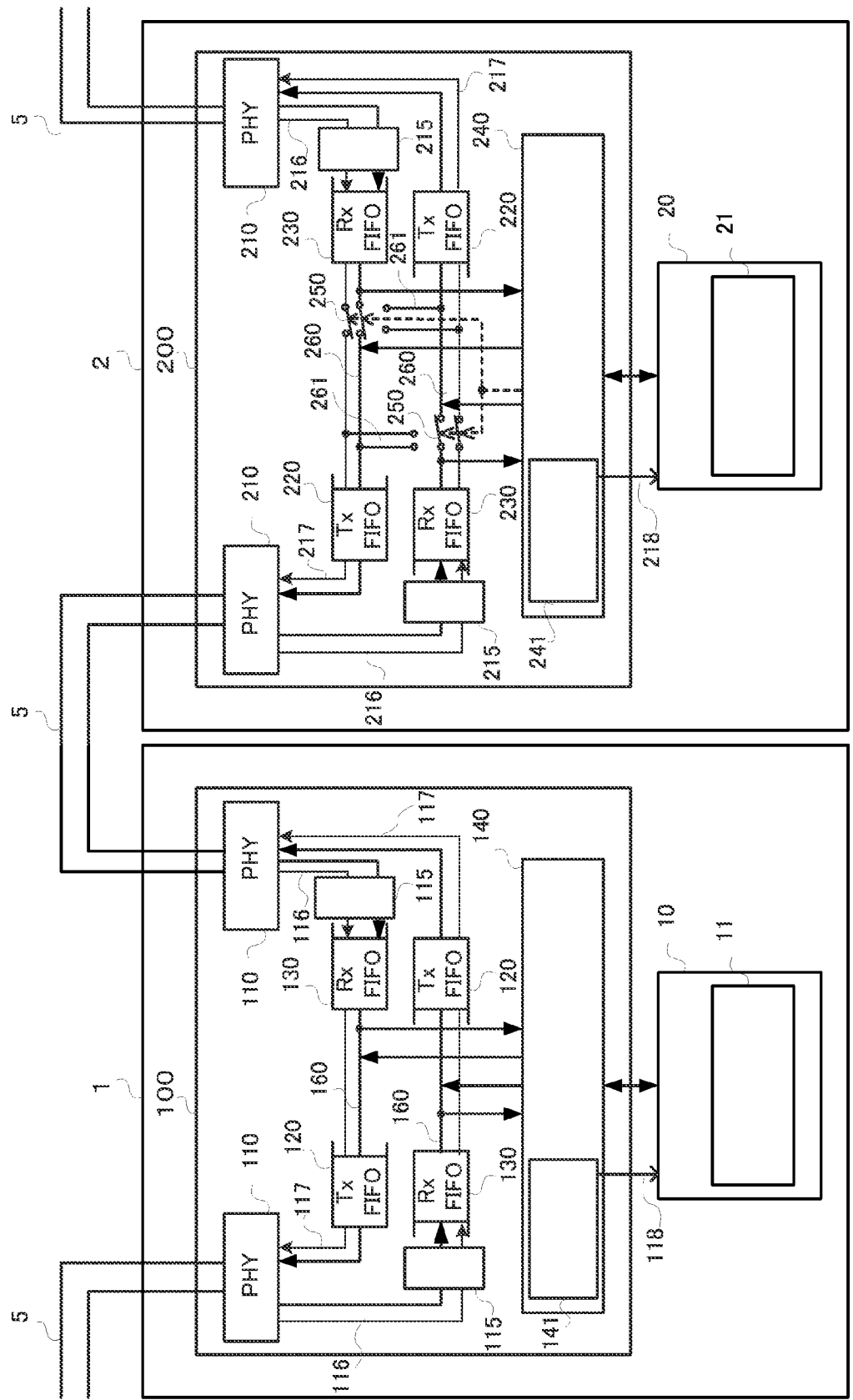
FIG. 1 is a block diagram showing the configuration of a communication device in a synchronized communication system according to the present invention.

Embodiments will now be described with reference to the accompanying drawings, wherein like reference numerals designate corresponding or identical elements throughout the various drawings.

FIG. 1 is a block diagram showing the configuration of communication devices in a synchronized communication system according to the present invention.

In FIG. 1, a first communication device 1 and a second communication device 2 are connected in series using a transmission path 5.

FIG. 1 shows one second communication device by way of example. In a synchronized communication system, however, a first communication device and one or more second communication devices are generally connected in series.

The first communication device 1 includes an in-device reference timer 141 for managing a reference time of the communication system. The in-device reference timer 141 is disposed in a LINK section 140. The second communication device 2 includes an in-device reference timer 241 used for synchronization with the reference time of the communication system. The in-device reference timer 241 is disposed in a LINK section 240.

The reference time is used as a basis for the synchronized communication system to start its operation and the like. The reference time is contained in a synchronization frame at the beginning of each communication cycle, and is sent to each second communication device from the first communication device.

For example, each second communication device decrements its reference time, and outputs an interrupt signal when the value of the reference time becomes a preset interrupt output time. With the use of the interrupt signals, the synchronized communication system can allow all the devices to start processes at the same timing. While in the present example, an in-device reference timer is mounted inside a LINK section, a dedicated timer may be mounted outside a LINK section.

The first communication device 1 includes a communication control section 100 that controls transmission/reception data, and a host central processing unit (CPU) section 10 that executes a calculation process based on data received by the communication control section 100 to create transmission data.

The host CPU section 10 includes a connected-device information storage section 11 that stores information about other communication devices connected to the transmission path 5.

The communication control section 100 includes two PHY sections (also referred to as first layers or physical layers) 110, a LINK section 140, two reception first-in first-out (Rx FIFO) sections 130, and two transmission first-in first-out (Tx FIFO) sections 120. Each of the PHY sections 110 is connected to the transmission path 5, and is configured to convert a logic signal into an electrical signal in order to deliver data to the transmission path 5. The LINK section 140 is configured to perform data transmission/reception with the PHY sections 110. The Rx FIFO sections 130 are configured to hold data received by the PHY sections 110. The Tx FIFO sections 120 are configured to hold transmission data from the LINK section 140 and the Rx FIFO sections 130. As shown in FIG. 1, the two PHY sections 110, Rx FIFO sections 130, and Tx FIFO sections 120 constitute two relay paths 160 over which data received by one of the PHY sections 110 is transferred to the other PHY section 110.

That is, the relay paths 160 allow data received by one of the PHY sections 110 to be directly transferred to another communication device from the other PHY section 110. The communication control section 100 further includes start frame delimiter (SFD) detection sections 115 between the PHY sections 110 and the Rx FIFO sections 130 for monitoring the SFD that follows the preamble of received data. The SFD is a 1-byte frame start flag, which is expressed as "5D" in hexadecimal.

Upon correct detection of the SFD, each of the SFD detection sections 115 immediately outputs a reception signal 116 output from the corresponding one of the PHY sections 110 to the other PHY section 110 as a transfer permission signal 117 through the corresponding one of the Rx FIFO sections 130 and the corresponding one of the Tx FIFO sections 120. Then, the SFD detection section 115 transfers the received data to the Tx FIFO section 120 through the Rx FIFO section 130.

Upon receipt of the transfer permission signal 117, the PHY section 110 immediately transfers the received data, which has been transferred from the Tx FIFO section 120, to the transmission path 5.

The transfer permission signal 117 and the received data are not output to the Rx FIFO section 130 when the transfer of the current frame is completed or when the current frame is interrupted due to a transmission error or the like. In other words, the transfer of received data from the PHY sections 110 to the transmission path 5 is kept stopped until the next time the SFD is correctly detected.

The PHY sections 110 are not limited to those configured to perform conversion between a logic signal and an electrical signal, but may be configured to perform conversion between a logic signal and an optical signal or perform conversion between a logic signal and a radio signal.

Figure 2:
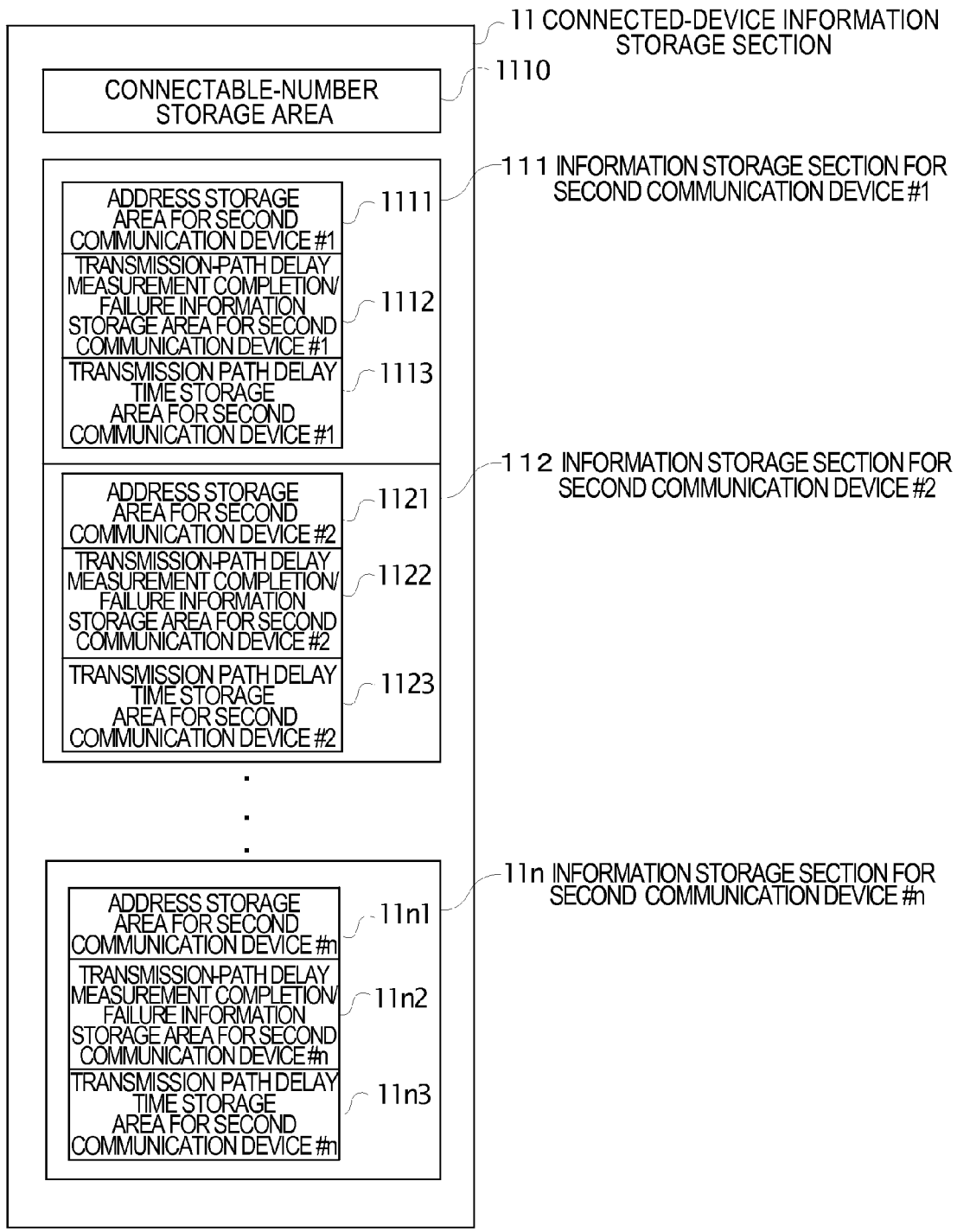
FIG. 2 is a diagram showing an example configuration of a connected-device information storage section.

FIG. 2 shows an example configuration of the connected-device information storage section 11 of the first communication device 1 shown in FIG. 1.

The connected-device information storage section 11 includes a connectable-number storage area 1110 that stores a number (in FIG. 2, n) representing the number of one or more connectable second communication devices #1, #2, ... #n that are connected to the first communication device 1, and second-communication-device information storage sections 111, 112, ... 11n that store information about the number n of connectable second communication devices.

The information storage section 111, 112, ... 11n further include address storage areas 1111, 1121, ... 11n1 for the individual communication devices, transmission-path delay measurement completion/failure information storage areas 1112, 1122, ... 11n2, and transmission path delay time storage areas 1113, 1123, ... 11n3 that store information obtained as a result of transmission path delay measurement.

Note that the number of connectable second communication devices is the number of second communication devices necessary for an application system to be realized, and is written in advance in the connectable-number storage area 1110 using an engineering tool or the like (not shown). Similarly, the addresses for specifying the second communication devices are also written in advance in the address storage areas 1111, 1121, ... 11n1.

Referring back to FIG. 1, the second communication device 2 includes a communication control section 200 that controls transmission/reception data, and a host CPU section 20 that executes a calculation process based on data received by the communication control section 200 to create transmission data.

The host CPU section 20 includes a local information storage section 21 that stores local information. The communication control section 200 includes two PHY sections 210, a LINK section 240 that performs data transmission/reception with the PHY sections 210, two Rx FIFO sections 230, and two Tx FIFO sections 220. Each of the PHY sections 210 is connected to the transmission path 5, and is configured to convert a logic signal into an actual electrical signal. The LINK section 240 is configured to perform data transmission/reception with the PHY sections 210. The Rx FIFO sections 230 are configured to hold data received by the PHY sections 210. The Tx FIFO sections 220 are configured to hold transmission data from the LINK section 240 and the Rx FIFO sections 230. The two PHY sections 210, Rx FIFO sections 230, and Tx FIFO sections 220 constitute two relay paths 260 over which data received by one of the PHY sections 210 is transferred to the other PHY section 210 when path selection switches 250 are connected to the relay paths 260. The communication control section 200 further includes SFD detection sections 215 between the PHY sections 210 and the Rx FIFO sections 230 for monitoring the SFD that follows the preamble of received data.

On the other hand, when the path selection switches 250 are connected to return paths 261, a transfer path over which data received by one of the PHY sections 210 is returned to the same PHY section 210 is formed. As described below, the return paths 261 are used for measuring a transmission path delay time from the first communication device 1 to the second communication device 2. Further, the path selection switches 250 are configured to connect the path for received data and the path for a transfer permission signal, which will be described below, to the relay paths 260 or the return paths 261 at the same timing.

When the path selection switches 250 are connected to the relay paths 260 in the normal operation, each of the two relay paths 260 includes one Rx FIFO section 230 and one Tx FIFO section 220.

Also when the path selection switches 250 are connected to the return paths 261, each of the two relay paths 260 includes one Rx FIFO section 230 and one Tx FIFO section 220.

In either case, data to be transferred is allowed to pass through one Rx FIFO section 230 and one Tx FIFO section 220. Further, the SFD detection sections 215 are located between the PHY sections 210 and the Rx FIFO sections 230, and monitor the SFD that follows the preamble of received data.

Upon correct detection of the SFD, each of the SFD detection sections 215 immediately outputs a reception signal 216 output from the corresponding one of the PHY sections 210 to the other PHY section 210 as a transfer permission signal 217 through the corresponding one of the Rx FIFO sections 230 and the corresponding one of the Tx FIFO sections 220. Then, the SFD detection section 215 transfers the received data to the Tx FIFO section 220 through the Rx FIFO section 230.

Upon receipt of the transfer permission signal 217, the PHY section 210 immediately transfers the received data, which has been transferred from the Tx FIFO section 220, to the transmission path 5.

The transfer permission signal 217 and the received data are not output to the Rx FIFO section 230 when the transfer of the current frame is completed or when the current frame is interrupted due to a transmission error or the like. In other words, the transfer of received data from the PHY sections 210 to the transmission path 5 is kept stopped until the next time the SFD is correctly detected.

In FIG. 1, only the second communication device 2 has the path selection switches 250 mounted therein. However, the first communication device 1 may also have the path selection switches 250 mounted therein so that both can have the same circuit configuration.

Figure 3:
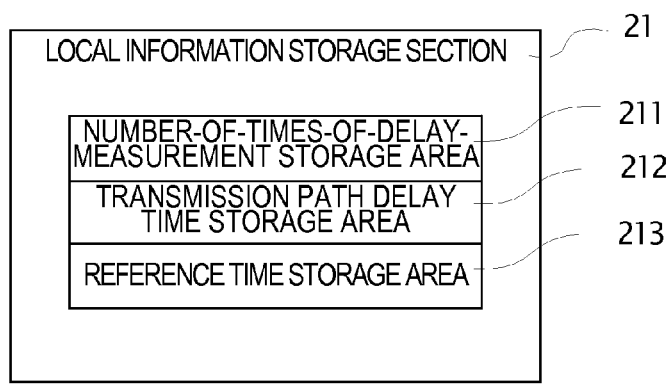
FIG. 3 is a diagram showing an example configuration of a local information storage section.

FIG. 3 shows an example configuration of the local information storage section 21 shown in FIG. 1. The local information storage section 21 includes a number-of-times-of-delay-measurement storage area 211, a transmission path delay time storage area 212, and a reference time storage area 213. The number-of-times-of-delay-measurement storage area 211 stores the number of times of delay measurement 605 (FIG. 8A) contained in a synchronization-correction-target specifying frame sent to the second communication device 2. The transmission path delay time storage area 212 stores a transmission path delay time 615 (FIG. 8B) contained in a transmission path delay measurement frame. The reference time storage area 213 is an area for storing a current reference time value 616 (FIG. 8C) contained in a synchronization frame.

Figure 4:
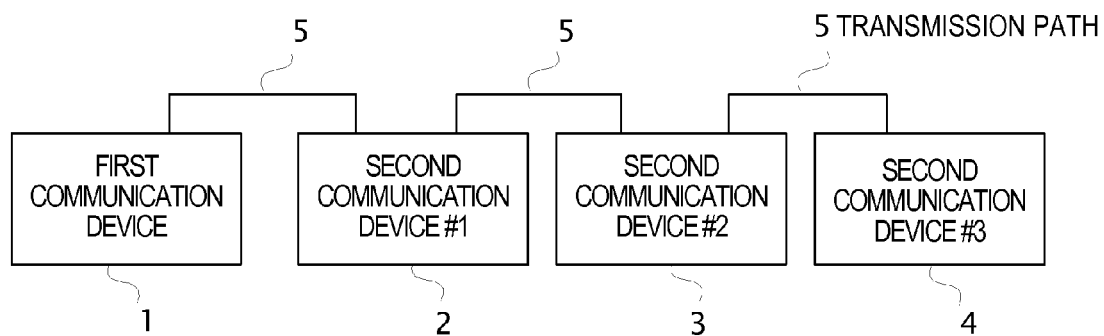
FIG. 4 is a diagram showing an example of a communication system according to the present invention.

FIG. 4 shows an example of a communication system according to the present invention.

In the present example, four communication devices are connected in series to a transmission path. A first communication device 1 manages a reference time. Each of second communication devices #1 to #3 (2 to 4) has a configuration similar to that shown in the block diagram of the second communication device 2 in FIG. 1, and is synchronized with the reference time of the first communication device 1.

In the present example, the first communication device 1 is connected in such a manner that the first communication device 1 is at the end of the transmission path 5. However, as explained with reference to FIG. 1, the first communication device 1 also has a relay function. Thus, the first communication device 1 may be connected in the middle of the transmission path 5.

Figure 5:
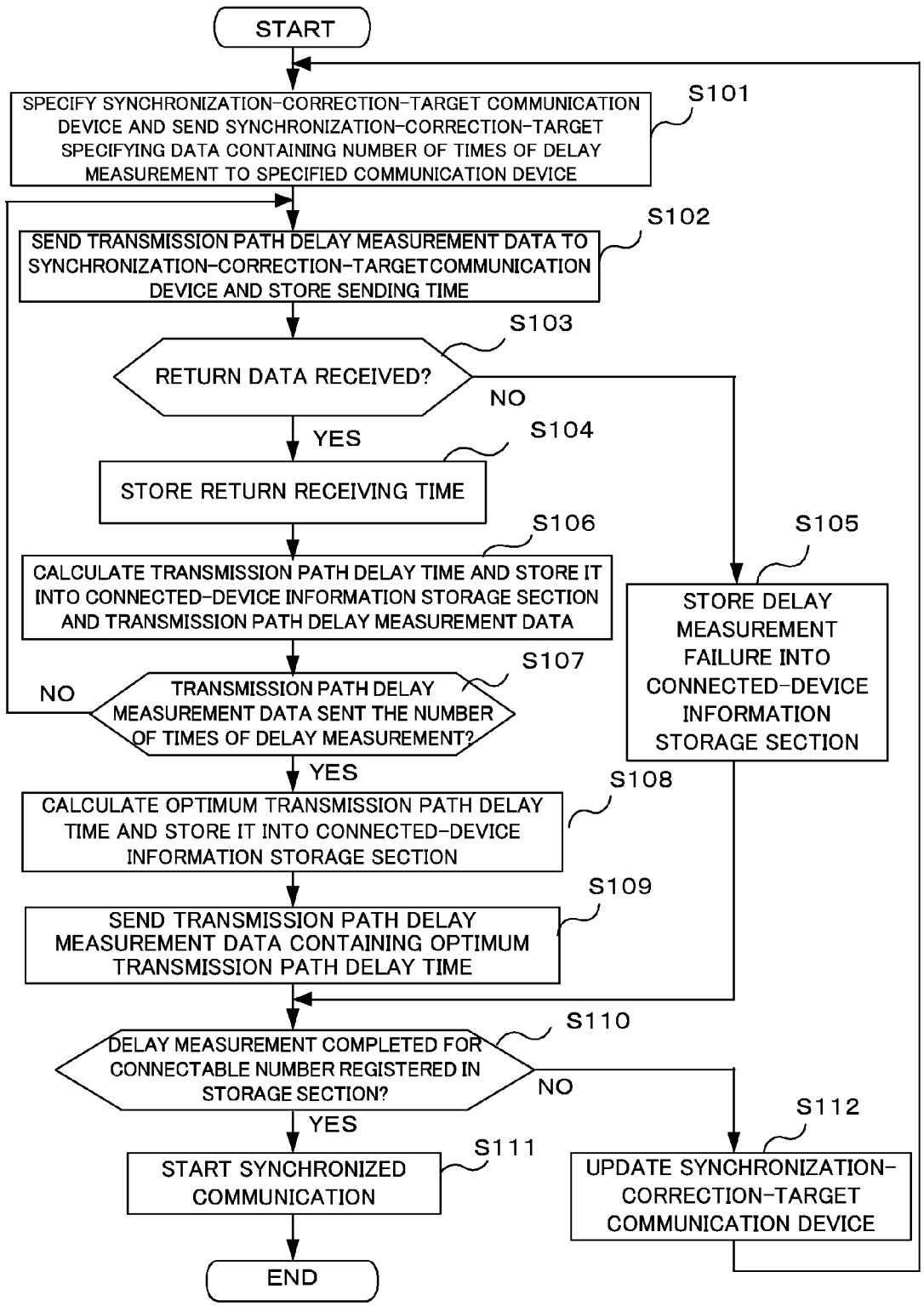
FIG. 5 is a flowchart showing a delay measurement procedure of a first communication device in the synchronized communication system according to the present invention.

FIG. 5 is a flowchart showing a delay measurement procedure of the first communication device 1 in the synchronized communication system according to the present invention. The delay measurement procedure is executed by the host CPU section 10. This flowchart is a diagram before the start of fixed cycle communication, and a flowchart after the start of fixed cycle communication will be described below.

In step S101, the first communication device 1 (FIG. 1) specifies one of the second communication devices #1 to #n about which information is stored in advance in the connected-device information storage section 11 (FIG. 2) as a synchronization-correction-target communication device (hereinafter referred to as a "target communication device"), and sends a synchronization-correction-target specifying frame (FIG. 8A) containing the number of times of delay measurement to the specified second communication device.

Then, in step S102, a transmission path delay measurement frame (FIG. 8B) is sent to the target communication device, and the time of sending the transmission path delay measurement frame is stored.

Then, when the transmission path delay measurement frame returned from the target communication device is received in step S103, the process proceeds to step S104. Otherwise, the process proceeds to step S105 in which the delay measurement failure is stored in the connected-device information storage section 11. Then, the process proceeds to step S110.

The failure of delay measurement means that, for example, a transmission path delay measurement frame has been sent to a second communication device that is determined to be present on the basis of the connectable-number storage area 1110 shown in FIG. 2, but no return data has been successfully received. The determination of failure of receipt may be performed based on the time up of a timer (not shown) or the like.

When the transmission path delay measurement frame returned from the target communication device has been received, in step S104, the return receiving time is stored. Then, in step S106, a transmission path delay time is calculated from the time of sending the transmission path delay measurement frame and the return receiving time, and is stored in the corresponding one of the transmission path delay time storage areas 1113 to 11$n$3 located in the information storage section for this target communication device in the connected-device information storage section 11.

Here, a method for calculating a transmission path delay time will be explained. In the second communication device 2 shown in FIG. 1, it can be regarded that there is no difference between the delay times for transfer data in the outgoing and incoming communications. This is because both in a case where the path selection switches 250 are set to the relay paths 260 in the normal operation and in a case where the path selection switches 250 are set to the return paths 261 for synchronized delay measurement, data to be transferred passes through one SFD detection section 215, one Rx FIFO section 230, and one Tx FIFO section 220, and the Rx FIFO section 230 immediately transfers the received data to the Tx FIFO section 220 so that the Tx FIFO section 220 immediately sends the data to the transmission path 5.

Therefore, if the time of sending the transmission path delay measurement frame is represented by Ts and the time of receiving the returned data is represented by Tr, the transmission path delay time of the transmission path 5 can be calculated by (Tr−Ts)/2.

Then, in step S107, it is checked whether the transmission path delay measurement frame has been sent a number of times corresponding to the number of times of delay measurement. If the transmission path delay measurement frame has not been sent the required number of times, the processing of steps S102 to S106 is repeated. If the transmission path delay measurement frame has been sent the required number of times, in step S108, an optimum transmission path delay time such as, for example, the average value is calculated and stored in the corresponding one of the transmission path delay time storage areas 1113 to 11$n$3 located in the information storage section for this target communication device in the connected-device information storage section 11. In step S109, a transmission path delay measurement frame (FIG. 8B) containing the optimum transmission path delay time in the transmission path delay time 615 is sent to the target second communication device.

In step S110, it is checked whether transmission path delay measurement has been completed for a number of second communication devices corresponding to the connectable number n stored in the connected-device information storage section 11. If the transmission path delay measurement has not been completed, in step S112, the target communication device is updated. Then, the process proceeds to step S101, and the subsequent processing of steps S101 to S110 is repeated. When the transmission path delay measurement has been completed, in step S111, a synchronization frame (FIG. 8C) is sent to all the second communication devices.

Figure 6:
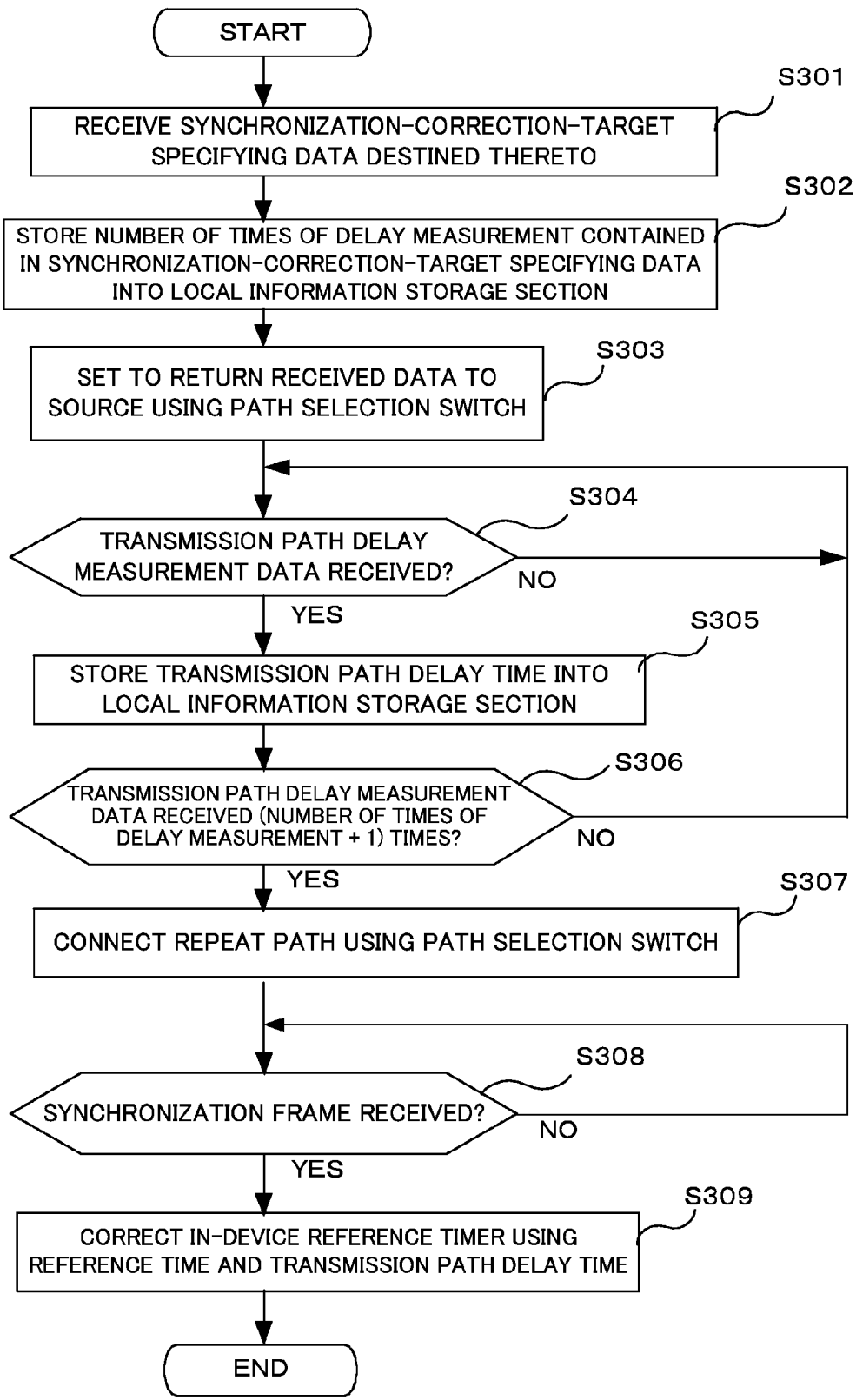
FIG. 6 is a flowchart showing a delay measurement procedure of a second communication device in the synchronized communication system according to the present invention.

FIG. 6 is a flowchart showing a delay measurement procedure of a second communication device in the synchronized communication system according to the present invention. The delay measurement procedure is executed by the host CPU section 20.

In step S301, the second communication device 2 (FIG. 1) receives a synchronization-correction-target specifying frame sent thereto. In step S302, the number of times of delay measurement contained in the received synchronization-correction-target specifying frame is stored in the number-of-times-of-delay-measurement storage area 211 (FIG. 3) of the local information storage section 21. In step S303, the relay paths are set to the return paths 261 (FIG. 1) using the path selection switches 250 (FIG. 1).

In step S304, the reception of a transmission path delay measurement frame is waited. When a transmission path delay measurement frame is received, in step S305, the transmission path delay time 615 contained in the transmission path delay measurement frame (FIG. 8B) is stored in the transmission path delay time storage area 212 (FIG. 3) of the local information storage section 21. Since the transmission path delay time is overwritten, the last received value is active.

Then, in step S306, it is checked whether the transmission path delay measurement frame (FIG. 8B) has been received (the number of times of delay measurement+1) times. When the transmission path delay measurement frame has not been received (the number of times of delay measurement+1) times, the process returns to step S304. When the transmission path delay measurement frame has been received (the number of times of delay measurement+1) times, the process proceeds to step S307, and the path selection switches 250 (FIG. 1) are connected to the relay paths 260 (FIG. 1) so that the configuration for normal operation is set.

Then, in step S308, the reception of a synchronization frame (FIG. 8C) is waited. Finally, in step S309, the in-device reference timer 241 (FIG. 1) is corrected using the reference time contained in the received synchronization frame and the transmission path delay time.

This correction may be performed by, for example, as in an exemplary embodiment shown in FIG. 9, the in-device reference timer 241 is updated to a value obtained by subtracting the transmission path delay time from the reference time. Also, when the in-device reference timer 241 is an up counter, an update to a value obtained by adding the transmission path delay time to the reference time is made.

FIG. 7 is a flowchart showing a delay measurement procedure during synchronized communication by the first communication device 1 in the synchronized communication system according to the present invention. The delay measurement procedure shown in FIG. 7 is a procedure for measuring a transmission path delay time when a new second communication device 2 (FIG. 1) is connected in a case where the first communication device 1 (FIG. 1) starts synchronized communication in a constant communication cycle in a state where a number of second communication devices corresponding to the connectable number stored in the connectable-number storage area 1110 (FIG. 2) of the connected-device information storage section 11 are not connected. The process based on this procedure is executed by the host CPU section 10.

The term "synchronized communication" is communication that is performed in a predetermined constant communication cycle between a first communication device and second communication devices after the first communication device sets a transmission path delay time in each of the second communication devices and sends a synchronization frame once.

In this synchronized communication, the first communication device performs communication in a constant communication cycle, such as sending a synchronization frame to each second communication device, sending a command frame, and receiving a response frame from each second communication device.

In a state where synchronized communication has been started, at the time of the start of a communication cycle, in step S201, the first communication device 1 starts synchronized communication with all the second communication devices #1 to #n (FIG. 2) (the number of which corresponds to that stored in the connectable-number storage area 1110) about which information is stored in the connected-device information storage section 11.

After the completion of the synchronized communication, in step S202, it is checked whether a response has been received from any of the second communication devices for which delay measurement failure has been recorded in the connected-device information storage section 11. If no response has been received, the process proceeds to step S208 in which the end of the communication cycle is waited. Then, the process proceeds to step S201.

If a response has been received, the process proceeds to step S203 in which the remaining time of the communication cycle is compared with the time required for transmission path delay measurement to check whether the transmission path delay measurement can be completed within the remaining time of the communication cycle.

At this time, the transmission path delay measurement time has a value that is determined by the equation given in Eq. 1 below using a maximum value Tmax_dly of the transmission path delay times stored in the connected-device information storage section 11 (the transmission path delay time to the second communication device that is the most far from the first communication device), the number of times Ncnt delay measurement is performed, and a relay time Trpt in a communication device determined by circuit configuration:

$$\text{Transmission path delay measurement time} = (2 \times T\text{max\_dly} + T\text{rpt}) \times (N\text{cnt} + 1) + \alpha \qquad \text{Eq. 1}$$

Eq. 1 is used for a new second communication device connected to a second communication device for which the measurement of transmission path delay time has already been completed and that is connected at the most far position from the first communication device. In Eq. 1, further, α denotes the time that is required for the process in the flowchart shown in FIG. 7 in the first communication device and that does not result from the value Tmax_dly or Trpt, which means, for example, the time required for calculating the average value or the like.

When it is determined in step S203 that the transmission path delay measurement cannot be completed within the remaining time of the communication cycle, the process proceeds to step S208. When it is determined in step S203 that the transmission path delay measurement can be completed within the remaining time of the communication cycle, the process proceeds to step S204. In step S208, the impossibility of measurement of a transmission path delay time can also be displayed on a display or the like (not shown).

In step S204, a synchronization-correction-target specifying frame (FIG. 8A) containing the number of times of delay measurement 605 is sent to a second communication device from which a response has been received and for which delay measurement failure has been recorded (hereinafter referred to as a "target communication device").

Then, in step S205, a transmission path delay measurement frame (FIG. 8B) is sent to the target communication device, and the time of sending the transmission path delay measurement frame is stored.

Then, when the transmission path delay measurement frame returned from the target communication device is received in step S206, the process proceeds to step S207. Otherwise, the process proceeds to step S208.

When the transmission path delay measurement frame returned from the target communication device has been received, in step S207, the time of receiving the returned data is stored. Then, in step S209, a transmission path delay time is calculated from the time of sending the transmission path delay measurement frame and the time of receiving the returned data, and is stored in the corresponding one of the transmission path delay time storage areas 1113 to 11n3 located in the information storage section for this target communication device in the connected-device information storage section 11.

The method for calculating a transmission path delay time is similar to that shown in FIG. 5.

In the second communication device 2 shown in FIG. 1, it can be regarded that there is no difference between the delay times for transfer data in the outgoing and incoming communications. This is because both in a case where the path selection switches 250 are set to the relay paths 260 in the normal operation and in a case where the path selection switches 250 are set to the return paths 261 for synchronized delay measurement, data passes through one Rx FIFO section 230 and one Tx FIFO section 220, and the Rx FIFO section 230 immediately transfers the received data to the Tx FIFO section 220 so that the Tx FIFO section 220 immediately sends the data to the transmission path 5.

Therefore, if the time of sending the transmission path delay measurement frame is represented by Ts and the time of receiving the transmission path delay measurement frame is represented by Tr, the transmission path delay time of the transmission path 5 can be calculated by (Tr−Ts)/2.

Then, in step S210, it is checked whether the transmission path delay measurement frame has been sent a number of times corresponding to the number of times of delay measurement. If the transmission path delay measurement frame has not been sent the required number of times, the processing of steps S205 to S209 is repeated. If the transmission path delay measurement frame has been sent the required number of times, in step S211, an optimum transmission path delay time such as, for example, the average value is calculated and stored in the corresponding one of the transmission path delay time storage areas 1113 to 11n3 located in the information storage section for this target communication device in the connected-device information storage section 11. In step S212, a transmission path delay measurement frame (FIG. 8B) containing the optimum transmission path delay time in the transmission path delay time 615 is sent to the target second communication device. In step S213, the end of the communication cycle is waited. Then, the process returns to step S201. The above steps are repeated.

If it is checked in step S202 whether or not response data included in the received response frame is response data from a second communication device for which consecutive synchronized communication errors have occurred, a transmission path delay time for a second communication device that is disconnected and reconnected during synchronized communication can also be measured using a procedure similar to that shown in FIG. 7.

FIGS. 8A to 8E show examples of communication data formats according to the present invention. FIGS. 8A, 8B, 8C, 8D, and 8E show an example of a synchronization-correction-target specifying frame, an example of a transmission path delay measurement frame, an example of a synchronization frame, an example of a command frame, and an example of a response frame which are sent or received by the first communication device 1 (FIG. 1), respectively.

The five types of data shown in FIGS. 8A to 8E commonly have a preamble 500, an SFD 501, a destination address 601, a source address 602, a data type 603, a data length 604, and a frame check sequence (FCS) 606 for detecting an error of transmission data. In the present example, the five pieces of data are identified using the data type 603.

The above five types of data are merely examples, and a frame having a different configuration can be added, as necessary, in accordance with necessity such as an application.

Figure 8A:
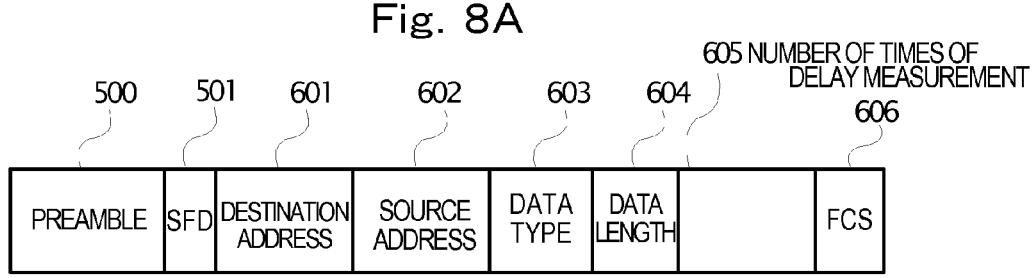

FIG. 8A shows an example of a synchronization-correction-target specifying frame which is sent from the first communication device to a second communication device for which the delay time is to be measured (synchronization-correction-target communication device). The destination address 601 contains addresses unique to synchronization-correction-target communication devices. The addresses are stored in the information storage sections 111 to 11n (FIG. 2) for the second communication devices #1 to #n in the connected-device information storage section 11.

Figure 8B:
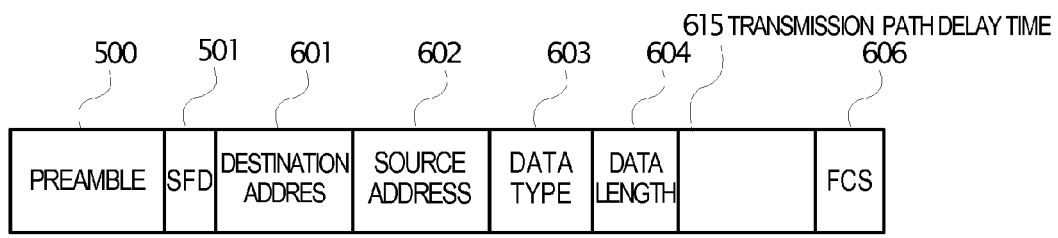

FIG. 8B shows an example of a transmission path delay measurement frame which is sent from the first communication device to a synchronization-correction-target communication device. A transmission path delay time 615 contains 0 at the time of the first transmission and contains a result of the (m−1)-th measurement at the time of the m-th transmission before the transmission path delay measurement frame is sent to the synchronization-correction-target communication device. After measurement has been performed a number of times corresponding to a preset number of times of delay measurement, the first communication device calculates an optimum transmission path delay time such as a maximum value of these measurement results, the average value, or a value obtained by adding an extra time to the average value, and contains the optimum transmission path delay time in the transmission path delay time 615. The resulting transmission path delay measurement frame is sent to the synchronization-correction-target communication device.

Figure 8C:
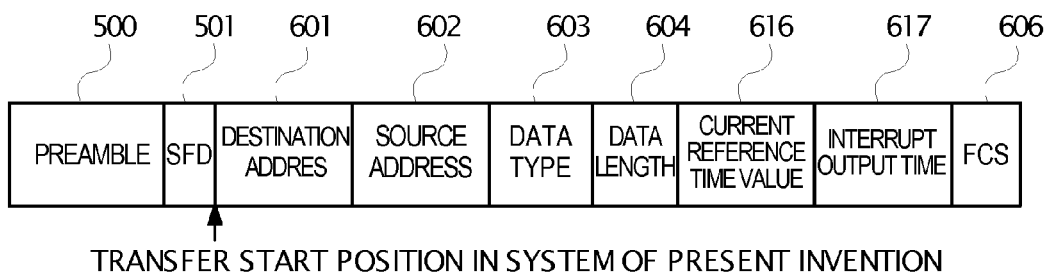

FIG. 8C shows an example configuration of a synchronization frame which is used in the present invention. A current reference time value 616 contains the value of the in-device reference timer 141 (FIG. 1) that is obtained when a synchronization frame is sent. An interrupt output time 617 is used for setting a timing at which each second communication device outputs an interrupt signal to the host CPU section 20 (FIG. 1), and is written by the host CPU section 10 (FIG. 1) through the LINK section 140 (FIG. 1).

The interrupt output time may be set to, for example, a timing at which the second communication device that is the most far from the first communication device receives a command frame and starts a process for command data included in the command frame.

Alternatively, the interrupt output time may be set to a timing at which the second communication device that last received a command frame sent from the first communication device to all second communication devices can start a process for command data included in the command frame.

Figure 8D:
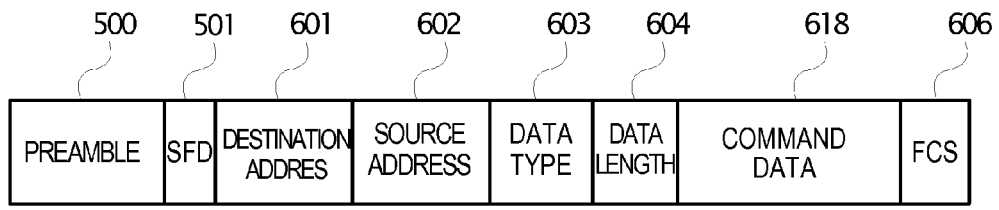

FIG. 8D shows a command frame which is sent from the first communication device to a second communication device. In general, the second communication device starts a process for command data 618 in synchronization with an interrupt signal output at the interrupt output time.

Figure 8E:
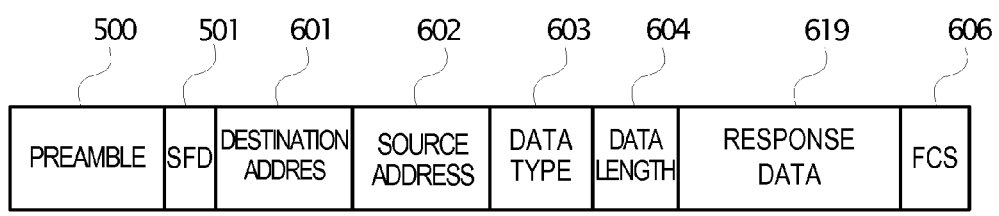

FIG. 8E shows a response frame which is received by the first communication device from a second communication device. In general, the second communication device sends this response frame after receiving a command frame from the first communication device.

FIG. 9 is a timing chart of communication synchronization according to the present invention, and shows, by way of example, the synchronization between the in-device reference timers 141 and 241 (FIG. 1) incorporated respectively in the first communication device and one or more second communication devices that constitute a communication system. When a synchronization frame S is sent from the first communication device, the second communication device #1 first receives this frame.

Upon receipt of this frame, the second communication device #1 updates the in-device reference timer 241 using a value obtained by subtracting a transmission path delay time Tdly_1 from the first communication device to the second communication device #1, which is measured in advance, from the current reference time value 616 (FIG. 8C) contained in the synchronization frame so that the value of the in-device reference timer 241 can become equal to the current value of the in-device reference timer 141 in the first communication device. Subsequently, upon receipt of this synchronization frame, the second communication device #2 also updates the in-device reference timer 241 using a transmission path delay time Tdly_2 from the first communication device 1 to the second communication device #2, which is measured in advance, and the current reference time value 616.

Accordingly, the in-device reference timer 141 in the first communication device and the in-device reference timers 241 in the second communication devices #1 and #2 are timed. Further, an interrupt signal is output when a match occurs between the value of the interrupt output time 617 contained in the synchronization frame and the values of the in-device reference timers 241 in the second communication devices #1 and #2. Thus, each communication device can output an interrupt for each communication synchronization to a host CPU at the same time.

Although an in-device reference timer of each communication device operates based on a separate clock (not shown), the difference in frequency between the individual clocks may be negligible because it is much smaller than that between the reference times corrected in each communication cycle.

According to the present invention, therefore, even when all communication devices are connected in series to a transmission path, the process for command data given in the same communication cycle can be started at the same interrupt timing. In addition, the communication cycle can be reduced.

Therefore, a contribution to improvement of control performance of a motion control system including a plurality of servo amplifiers, relays, sensors, and the like as second communication devices can be made.

What is claimed is:

1. A synchronized communication system comprising:
a first communication device; and
one or more second communication devices each configured to communicate with the first communication device in a predetermined communication cycle,
the first communication device including
a first communication control section configured to be connected to a transmission path and to control data to be sent and received, and
a first host central processing unit configured to be connected to the first communication control section and to execute a calculation process based on data received by the first communication control section and data in a connected-device information storage section incorporated in the first host central processing unit to create transmission data and send the transmission data to the first communication control section,
the first communication control section including
two first PHY sections each configured to convert a logic signal into an electrical signal,
two first reception first-in first-out sections configured to be connected to the first PHY sections and to receive data received by the first PHY sections,
two first transmission first-in first-out sections configured to be connected to the first PHY sections and to output the received data to the first PHY sections, and
a first LINK section having a first in-device reference timer configured to generate an interrupt signal at a preset timing,
each of the two first reception first-in first-out sections and each of the two first transmission first-in first-out sections being connected via a relay path,
the two relay paths and the first LINK section being connected to each other,
wherein the first LINK section sends a synchronization-correction-target specifying frame, a transmission path delay measurement frame, and a synchronization frame,
each of the second communication devices including
a second communication control section configured to be connected to a transmission path and to control data to be sent and received, and
a second host central processing unit configured to be connected to the second communication control section and to execute a calculation process based on data received by the second communication control section and data in a local information storage section incorporated in the second host central processing unit to create transmission data and send the transmission data to the second communication control section,
the second communication control section including
a second upstream PHY section and a second downstream PHY section each configured to convert a logic signal into an electrical signal, the second upstream PHY section being connected to the first downstream PHY section or to a second downstream PHY section included in a second communication device other than the second communication device, a second upstream reception first-in first-out section connected to the second upstream PHY section and to receive data received by the second upstream PHY section, a second downstream reception first-in first-out section connected to the second downstream PHY section and to receive data received by the second downstream PHY section, a second upstream transmission first-in first-out section connected to the second upstream PHY section and configured to output the data received by the second downstream reception first-in first-out section to the second upstream PHY section, a second downstream transmission first-in first-out section connected to the second downstream PHY section and configured to output the data received by the second upstream reception first-in first-out section to the second downstream PHY section, a second LINK section having a second in-device reference timer configured to generate an interrupt signal at a preset timing, a downward path selection switch connected to the second upstream reception first-in first-out section and to switch paths between a downward relay path connecting to the second downstream transmission first-in first-out section and a upstream return path connecting to the second upstream transmission first-in first-out section, and an upward path selection switch connected to the second downstream reception first-in first-out section and to switch paths between an upward relay path connecting to the second upstream transmission first-in first-out section and a downstream return path connecting to the second downstream transmission first-in first-out section, wherein the second LINK section controls switching of the downward path selection switch and the upward path selection switch, and the switching of the downward path selection switch and the switching of the upward path selection switch are performed at a same time, wherein in a normal state, the second LINK section controls the switching to form the upward and downward relay paths, wherein upon receipt of the synchronization-correction-target specifying frame, the second LINK section controls the switching to form the upstream and downstream return paths, wherein upon receipt of the transmission path delay measurement frame a predetermined number of times after receiving the synchronization-correction-target specifying frame, the second LINK section controls the switching to form the upward and downward relay paths, and wherein upon receipt of the synchronization frame sent from the first communication device, the second in-device reference timer is corrected so as to be synchronized with a reference time in the synchronized communication system, wherein the first communication device separately measures transmission path delay times to the second communication devices, separately notifies the second communication devices of the transmission path delay times, and sends a current reference time value in the communication system for each communication cycle, and wherein each of the second communication devices corrects the received current reference time value using the notified transmission path delay time, and sets the corrected value in the second in-device reference timer.

2. The synchronized communication system according to claim 1, wherein the first communication device includes two first start-frame-delimiter detection sections, each of the first start-frame-delimiter detection sections being disposed between each of the first PHY sections and one of the first reception first-in first-out sections connected to the each of the first PHY sections, and wherein upon detection of a start frame delimiter indicating a frame start signal that follows a preamble in data received by one of the first PHY sections, a corresponding one of the first start-frame-delimiter detection sections immediately transfers the received data to the transmission path through other first PHY section.

3. The synchronized communication system according to claim 1, wherein the second communication control section includes a second upstream start-frame-delimiter detection section and a second downstream start-frame-delimiter detection section, the second upstream start-frame-delimiter detection section being disposed between the second upstream PHY section and the second upstream reception first-in first-out section, the second downstream start-frame-delimiter detection section being disposed between the second downstream PHY section and the second downstream reception first-in first-out section, wherein upon detection of a start frame delimiter by the second upstream start-frame-delimiter detection section indicating a frame start signal that follows a preamble in data received by the second upstream PHY section, the second upstream start-frame-delimiter detection section immediately transfers the received data to the transmission path through the second downstream PHY section, and wherein upon detection of a start frame delimiter by the second downstream start-frame-delimiter detection section indicating a frame start signal that follows a preamble in data received by the second downstream PHY section, the second downstream start-frame-delimiter detection section immediately transfers the received data to the transmission path through the second upstream PHY section.

4. The synchronized communication system according to claim 1, wherein the first communication device stores an interrupt output time in the synchronization frame and sends the synchronization frame to the second communication devices, and each of the second communication devices sets the received interrupt output time in the second in-device reference timer and outputs a synchronization interrupt signal when a value of the second in-device reference timer has reached the interrupt output time.

5. The synchronized communication system according to claim 1, wherein after the first communication device starts synchronized communication with a constant communication cycle including sending a synchronization frame and a command frame to the second communication devices and receiving response frames from the second communication devices, when the first communication device detects a new second communication device that has been connected to the synchronized communication system during the synchronized communication with the second communication devices, the first communication device measures a transmission path delay time to the new second communication device and notifies the new second communication device of the transmission path delay time within a time that remains after predetermined communication has been performed in the communication cycle.

6. A synchronized communication system comprising:

a first communication device; and a second communication device to communicate with the first communication device in a predetermined communication cycle, the first communication device sending a synchronization-correction-target specifying frame, a transmission path delay measurement frame, and a synchronization frame to the second communication device, the second communication device comprising:
- a communication controller connected to a transmission path and to control data to be sent and received through the transmission path; and
- a host CPU connected to the communication controller and to create transmission data and send the transmission data to the communication controller, the communication controller comprising:
- an upstream PHY device and a downstream PHY device, each configured to convert a logic signal into an electrical signal, the upstream PHY device being connected to other communication device than the second communication device;
- an upstream reception FIFO device connected to the upstream PHY device and to receive data received by the upstream PHY device;
- a downstream reception FIFO device connected to the downstream PHY device and to receive data received by the downstream PHY device;
- an upstream transmission FIFO device connected to the upstream PHY device and to output the data received by the downstream reception FIFO device to the upstream PHY device;
- a downstream transmission FIFO device connected to the downstream PHY device and to output the data received by the upstream reception FIFO device to the downstream PHY device;
- a LINK device having an in-device reference timer to generate an interrupt signal at a preset timing;
- a downward path selection switch connected to the upstream reception FIFO device and to switch paths between a downward relay path connecting to the downstream transmission FIFO device and an upstream return path connecting to the upstream transmission FIFO device; and
- an upward path selection switch connected to the downstream reception FIFO device and to switch paths between an upward relay path connecting to the upstream transmission FIFO device and a downstream return path connecting to the downstream transmission FIFO device, wherein the LINK device controls switching of the downward path selection switch and the upward path selection switch to form the upward relay path and the downward relay path at a same time and to form the upstream return path and the downstream return path at a same time.

7. The synchronized communication system according to claim 6, wherein in a normal state, the LINK device controls the switching to form the upward and downward relay paths, wherein upon receipt of the synchronization-correction-target specifying frame, the LINK device controls the switching to form the upstream and downstream return paths, wherein upon receipt of the transmission path delay measurement frame a predetermined number of times after receiving the synchronization-correction-target specifying frame, the LINK device controls the switching to form the upward and downward relay paths, and wherein upon receipt of the synchronization frame sent from the first communication device, the in-device reference timer is corrected so as to be synchronized with a reference time in the synchronized communication system.

8. The synchronized communication system according to claim 7, wherein the first communication device separately measures transmission path delay times to the second communication device, notifies the second communication device of the transmission path delay times, and sends a current reference time value in the communication system for each communication cycle, and wherein the second communication devices corrects the received current reference time value using the notified transmission path delay time, and sets the corrected value in the in-device reference timer.

9. The synchronized communication system according to claim 8, wherein the communication controller includes an upstream start-frame-delimiter detector and a downstream start-frame-delimiter detector, the upstream start-frame-delimiter detector being disposed between the upstream PHY device and the upstream reception FIFO device, the downstream start-frame-delimiter detector being disposed between the downstream PHY device and the downstream reception FIFO device, wherein upon detection of a start frame delimiter by the upstream start-frame-delimiter detector indicating a frame start signal that follows a preamble in data received by the upstream PHY device, the upstream start-frame-delimiter detector immediately transfers the received data to the transmission path through the downstream PHY device, and wherein upon detection of a start frame delimiter by the downstream start-frame-delimiter detector indicating a frame start signal that follows a preamble in data received by the downstream PHY device, the downstream start-frame-delimiter detector immediately transfers the received data to the transmission path through the upstream PHY device.

10. The synchronized communication system according to claim 8, wherein the first communication device stores an interrupt output time in the synchronization frame and sends the synchronization frame to the second communication device, and the second communication device sets the received interrupt output time in the second in-device reference timer and outputs a synchronization interrupt signal when a value of the second in-device reference timer has reached the interrupt output time.

11. The synchronized communication system according to claim 8, wherein after the first communication device starts synchronized communication with a constant communication cycle including sending a synchronization frame and a command frame to the second communication device and receiving response frames from the second communication device, when the first communication device detects a new second communication device that has been connected to the synchronized communication system during the synchronized communication with the second communication device, the first communication device measures a transmission path delay time to the new second communication device and notifies the new second communication device of the transmission path delay time within a time that remains after predetermined communication has been performed in the communication cycle.

* * * * *